(No Model.)
J. A. CUSHWA.
REIN SUPPORTER AND PROTECTOR.
No. 310,883. Patented Jan. 20, 1885.
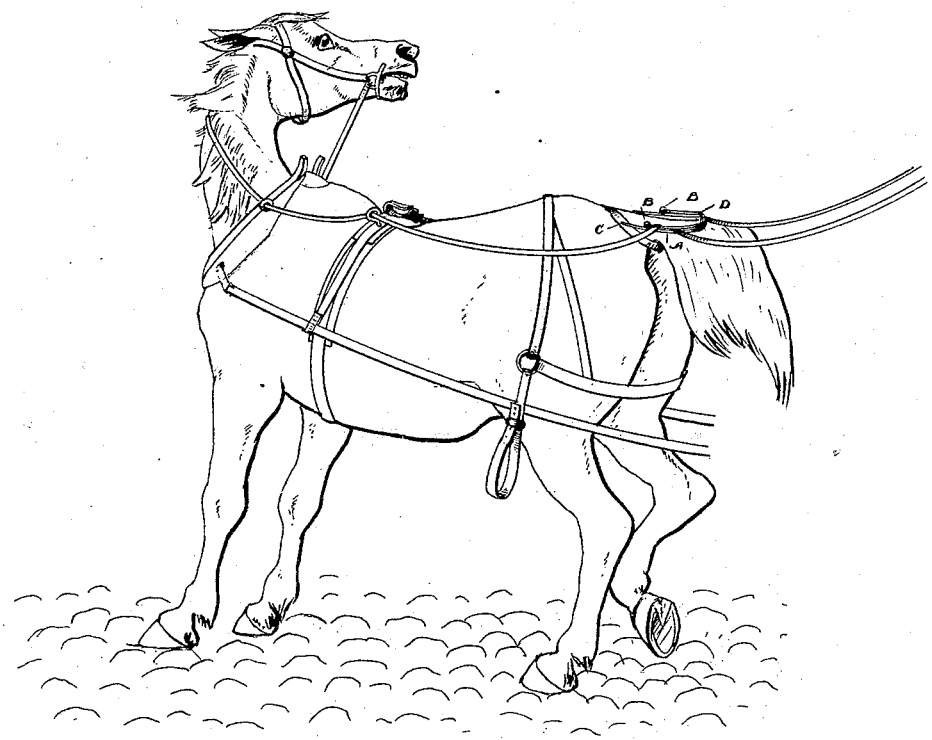
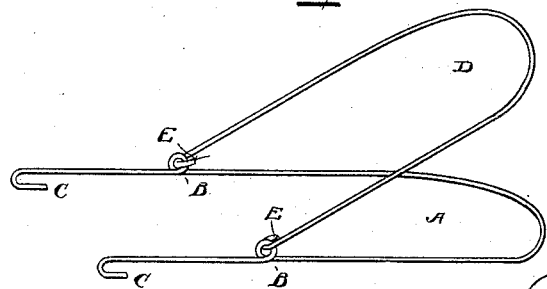
WITNESSES
James A. Cushwa
INVENTOR
by C. A. Snow
Attorneys

United States Patent Office.

JAMES ALBERT CUSHWA, OF ISLE ST. GEORGE, OHIO.

REIN SUPPORTER AND PROTECTOR.

SPECIFICATION forming part of Letters Patent No. 310,883, dated January 20, 1885.

Application filed October 23, 1884. (No model.)

*To all whom it may concern:*

Be it known that I, JAMES A. CUSHWA, a citizen of the United States, residing at Isle St. George, in the county of Ottawa and State of Ohio, have invented a new and useful Improvement in Rein Supporters and Protectors, of which the following is a specification, reference being had to the accompanying drawings.

My invention relates to rein supporters and protectors; and it consists in the construction and novel arrangement of parts, as will be hereinafter fully described, and particularly pointed out in the claim.

In the drawings, Figure 1 is a view in perspective of my improved rein supporter and protector, and Fig. 2 is a view showing the device in place.

Referring by letter to the accompanying drawings, A designates the longer wire, which is bent in U form, and is provided with loops B B intermediate of its ends, and hooks C C at its ends.

D designates the shorter wire, which is also U form, and is provided with eyes E E at the ends of its arms, which eyes are linked into the loops B B, and form hinges in connection with said loops. The hooks C C, when the device is in place, are fastened to the buckles on the crupper-strap, or loops may be especially provided for the purpose, and works on the principle of a hinge. The reins pass between the U-form wires, and both wires go over or on top of the tail. By this arrangement, when the horse switches its tail, the protector and supporter carries the reins up out of the way of the tail, and the tail is prevented from getting over the lines, which has been heretofore a source of very much annoyance to persons driving horses. A rein-guard consisting of a rigid frame or rod attached at its ends and at its rear portion to the harness, and extending backward over the tail of the animal and out of contact therewith, whereby the reins are prevented from catching beneath the tail without impeding the motion of the latter, has been used prior to my invention, and a rod having its ends bent to form loops has been combined with legs for supporting it on the harness and a brace for holding it in place upon the harness for a purpose similar to mine; and I therefore make no claim to either of these last-mentioned constructions.

Having thus fully described my invention, what I claim as new, and desire to secure by Letters Patent of the United States, is—

The rein supporter and protector herein described, consisting of the wires A and D, hinged together and provided with the hooks C C, substantially as specified.

In testimony that I claim the foregoing as my own I have hereto affixed my signature in presence of two witnesses.

JAMES ALBERT CUSHWA.

Witnesses:
HELENA TOWNSEND,
LAURA CUSHWA.